United States Patent [19]

Voellmy et al.

[11] 3,970,097

[45] July 20, 1976

[54] APPARATUS FOR MEASURING A VOLUME OF LIQUID AND METHOD OF OPERATING SAID APPARATUS

[75] Inventors: Hans Rudolf Voellmy; Hermann Gähwiler, both of Zurich, Switzerland

[73] Assignee: Contraves AG, Zurich, Switzerland

[22] Filed: Sept. 8, 1975

[21] Appl. No.: 611,499

[30] Foreign Application Priority Data

Sept. 23, 1974  Switzerland....................... 12846/74

[52] U.S. Cl.................................. 137/1; 137/565;
128/2.05 F; 73/194 E; 73/194 R
[51] Int. Cl.².......................................... G01F 1/00
[58] Field of Search........... 73/194 E, 194 R; 137/1, 137/565, 559; 128/2.05 F

[56] References Cited
UNITED STATES PATENTS
3,592,057  7/1971  Boe et al............................ 73/194 R
3,693,436  9/1972  Gildner.............................. 73/194 E Primary Examiner—Henry T. Klinksiek
Attorney, Agent, or Firm—Werner W. Kleeman

[57]  ABSTRACT

A method of and apparatus for measuring or measuring-out a predetermined volume of a liquid flowing through a conduit or line, comprising a first conduit section containing a measurement path and at one end connected with the outlet conduit of a connection element which interconnects a first inlet conduit and a second inlet conduit. The first conduit section is operatively connected at its other end through the agency of a first valve with the low pressure side of a pump device. The first inlet conduit is continuously connected with a liquid container via a second conduit section which causes a dynamic pressure drop in the flowing liquid. Additionally, the second inlet conduit is continuously connected with a fluid container and the fluid container is connected via a second valve with a compartment, whereas the liquid container is continuously connected with the compartment and the high pressure side of the pump device opens into said compartment.

13 Claims, 6 Drawing Figures

APPARATUS FOR MEASURING A VOLUME OF LIQUID AND METHOD OF OPERATING SAID APPARATUS

BACKGROUND OF THE INVENTION

The present invention relates to a new and improved construction of apparatus for measuring or measuring-out — hereinafter generally simply referred to as measuring — a predetermined volume of a liquid flowing through a conduit or line and further pertains to a method of operating the aforesaid apparatus.

During physical, chemical or medical measurements it may be necessary to measure a predetermined volume of liquid or to turn-on measuring apparatuses only during the throughpassage of a predetermined volume of the liquid. An example of this environment of use is the automatic counting of blood cells or particles. It also can be necessary to detect the flow rate of the liquid, i.e. the volume which flows through per unit of time. This is useful for instance in the case of capillary viscometers.

SUMMARY OF THE INVENTION

It is a primary object of the present invention to provide a new and improved construction of apparatus for measuring a volume of liquid and a method of operating such apparatus providing high accuracy and reliable performance.

A further specific object of this invention aims at an apparatus for measuring a volume of liquid and a method of operating such apparatus, which apparatus is relatively simple in construction, economical to manufacture, provides high performance operating characteristics, is easy to use, and requires a minimum of servicing and maintenance.

The invention proceeds from a heretofore known method of measuring liquid flow by means of an air bubble which is entrained by the liquid and determining the throughpassage of the air bubble at two measuring points spaced from one another along a measurement path in order to determine the volume of liquid which is to be detected, as the same has been taught, for instance, in U.S. Pat. No. 3,592,057, granted July 13, 1971. From the time of passage of the air bubble through the first measuring point until passage of the air bubble through the second measuring point there flows through the measurement path the volume of liquid which is to be measured. At the same time by means of signals generated by the measuring of sensing points it is possible to turn-on or turn-off a measuring apparatus for various purposes or to otherwise control the same.

For the determination of the flow rate of the liquid, that is to say, a volume of liquid per unit of time, there is measured and evaluated, apart from the liquid volume, also the time required for the air bubble to pass through the measurement path between both measuring points. Moreover, it can be advantageous to arrange more than only two measuring or sensing points along the measurement path in order to detect irregularities in the flow rate or to be able to eliminate faults caused thereby.

Continuing, from Swiss Pat. No. 396,459 it is known to the art to add to a liquid flowing in a conduit or line segments or potions portions a fluid which is insoluble therein for the purpose of dividing this liquid into different portions or sections which are separated from one another in that the fluid portions or segments fill out the entire cross-section of the conduit. To this end quantities of the liquid and the fluid which are accommodated or matched to one another are brought together in an approximately T-shaped connection element. By means of synchronously operated dosing pumps the liquid is sucked by means of negative pressure through the beam or leg of the connection element and the fluid is propelled by excess pressure through the web or arm of the connection element. With such type equipment there are required two dosing pumps which are operatively coupled with one another, resulting in a construction which both in the production thereof and during its operation is rather sensitive and expensive.

In Swiss Pat. No. 452,933 it is proposed to propel the liquid by means of the excess pressure generated by a first pump through the leg or beam of the connection element. In order to propel the fluid through the arm or web of the connection element there is required a second pump which is constructed as a dosing device for the admission of the correct quantity of fluid. Also with this equipment two pumps are required, one of which moreover is a rather sensitive and expensive dosing pump.

In German Pat. publication No. 2,143,229 there is proposed for the periodic, clocked or cyclic admission of an exactly measured fluid segment into a liquid stream flowing in a connection element of the above type, to convey the liquid continuously through the leg or beam of the connection element by means of a hose-type or elastic sleeve pump. Further a hollow compartment of practically constant volume is periodically and alternately connected with a source for the fluid which is at a constant pressure and also with the arm or web of the connection element, and this alternating connection operation takes place in synchronism with the actuation of the aforementioned hose-type or elastic sleeve pump. However, this construction constitutes an apparatus requiring high-speed operating valves and the requisite control thereof. Additionally, with this equipment there also are necessary at least two pumps, and specifically, on the one hand, the hose-type or elastic sleeve pump and, on the other hand, a pump for providing an excess pressure in the fluid source which is correlated to the pressure at the outlet of the connection element.

With the foregoing in mind it is still a further noteworthy and important object of the present invention to provide an apparatus wherein it is possible in a simpler and less expensive manner and by means of only one pump, and while the system operates with relatively great accuracy and operational reliability, to measure a predetermined volume of liquid flowing through a conduit.

Now in order to implement these and still further objects of the invention, which will become more readily apparent as the description proceeds, the invention contemplates an apparatus for measuring a predetermined volume of a liquid flowing through a conduit or line, said apparatus comprising a first conduit section or portion containing a measurement path and connected at one end with an outlet conduit or line of a connection element which unites or interconnects a first inlet conduit and a second inlet conduit. The first conduit section is connected at the other end through the agency of a first valve with the low pressure side of a pump device or pump. Furthermore, the first inlet conduit is continuously connected with a liquid container via a second conduit section which brings about a dynamic pressure drop in the flowing liquid, and additionally the second inlet conduit is continuously connected with a fluid container. The fluid container is connected via a second valve with a compartment or space, the liquid container is continually connected with the compartment, and the high pressure side of the pump device opens into said compartment.

According to a simplified exemplary embodiment of the invention the first valve and the pump device are constructionally and functionally united as a valve-pump in such a manner that during operation of the pump the valve is open and when the pump is shut-off the valve is closed. According to a further simplified manifestation of the invention the pump in its shut-off condition is sealed and itself serves as a valve.

In order to operate the apparatus of this development during the starting condition of the system the conduit is at least partially filled with the liquid, whereas the valves are closed. By opening the first valve the conduit is exposed to the negative pressure of the pump device, the liquid is propelled through the conduit, a segment or portion of the fluid is introduced into the liquid at the connection element and there is ascertained its passage through the measurement path. Thereafter the first valve is again closed and the closed valve is periodically opened in order to compensate the pressure between the fluid container and the aforementioned compartment, so that the starting condition is again established.

When using air as the fluid medium or fluid then a construction of apparatus is advantageous wherein the aforementioned compartment or space contains the entire surrounding air or recirculated air, as the case may be. Consequently, there is realized the result that the liquid container, the outlet of the pump device and the inlet of the second valve are opened with respect to the surrounding or recirculated air.

According to a further and equally advantageous construction of the apparatus, the aforementioned compartment or space is filled with a gas which is insoluble in the liquid and which is sealed-off with respect to the surrounding or ambient air. Consequently, there does not exist any absolutely required correlation between the pressure at a random location of the apparatus and the pressure of the surrounding air. According to a variant of this equipment construction the pressure of the surrounding air is equal to the pressure at that point or location of the apparatus where the first valve is connected with the pump device. The pressure at the pump device at the negative or low pressure side is then equal to the pressure of the surrounding air and at the high or excess pressure side such pressure is greater than that of the surrounding air, and the outlet of the first valve and the inlet of the pump device are open towards the surrounding air, there again being used air as the fluid or fluid medium.

During operation of the apparatus there can be employed as the fluid a second liquid which is immiscible with the liquid which is to be measured. Hence, the fluid container is only partially filled with the liquid used as the fluid, the remaining portion of the fluid container is filled with gas just as the aforementioned compartment or space with which it is connected via the second valve. Due to the expansion of this volume of gas the liquidous and therefore incompressible fluid is propelled into the conduit. During pressure compensation or equalization, according to a variant of the invention, new fluid can be introduced into the fluid container by suction.

According to a further advantageous construction of the apparatus of this development a separator is provided between the first valve and the pump device for separating the liquid from the fluid. In this way there is achieved the beneficial result that the pump device only directly acts upon the fluid and can be optimumly designed and operated as a fluid pump. According to a variant of the apparatus in which the pressure at the pump device at the low pressure side is equal to the pressure of the surrounding air and at the high pressure side is greater than the pressure of the surrounding air, the separator can be open in the direction of the surrounding air, and the pump device is then provided as an air compressor.

The energy required for the introduction of the fluid segment or portion into the liquid and the energy required for propelling the liquid through the conduit can be advantageously stored in a gaseous medium or a respective gaseous medium. With the separator sealed-off there can be advantageously undertaken an arrangement wherein an upper portion of the separator is filled with gas and possesses a considerably greater volume than the volume to be measured by the apparatus and corresponding to the measurement path, and furthermore, the pump device is operatively connected with this gas-filled portion of the separator, and finally this pump device is constructed as a valve pump. In this way there is achieved the result that the suction action brought about by the negative pressure in the gas-filled portion of the separator is adequate for carrying out at least one measuring operation. Consequently, the pump device can be shut-off during the measuring operation, and all disturbances caused thereby, and especially vibrations and jarring, are eliminated. It is sufficient if from time to time (however not during a measuring operation) there is again established the negative pressure in the gas-filled portion of the separator. Also in the case of a separator which is open in the direction of the surrounding air, it is advantageous to construct the pump device as a valve pump. According to this variant of the invention, the compartment which is exposed to the excess pressure receives a quantity of air, the expansion of which from the excess pressure to the pressure of the surrounding air corresponds to a change in volume which is considerably greater than the volume to be measured by the apparatus and corresponding to the measurement path. Also in this way there is achieved the result that the pressure effect is adequate to carry out at least one measuring operation, and consequently, the pump device can be shut-off during the measurement operation.

For the faultless operation of the apparatus there is required a clean departure or breaking-away of the fluid segment or portion from the inlet conduit to the connection element. For this purpose the connection element is preferably designed such that the first inlet conduit or line which is connected with the liquid container merges with the outlet conduit containing the measurement path with essentially the same cross-section or cross-sectional area and direction, whereas the second inlet conduit or line connected with the fluid container opens at an inclination into such outlet conduit and in a direction which faces away from the flow direction. In this respect the angle of inclination advantageously amounts to approximately 135°, especially when air is used as the fluid.

During operation of the inventive apparatus the length of a fluid segment or portion is not determined by the duration of opening of a valve, rather by the size of the gas volume in the fluid container and by the pressure differential delivered by the pump device as a consequence of the dynamic pressure drop in the corresponding conduit section. This dynamic pressure drop can be produced in known manner by employing a capillary, a pipe coil, a partially closed needle valve and the like in the corresponding conduit section. The always still present variation of the length of a fluid segment or portion is of no consequence since there is taken into account the same front or face of the fluid segment at two spaced detectors or sensors, and thus, there are not placed any great requirements upon the rapidity and the accurate repetition as a function of time of the opening and closing of the valve. The operation of the apparatus is not dependent upon whether the forward, advancing front or the rear, trailing front of a fluid segment has been detected by the sensors, provided that at all of the sensors or detectors it is the same front.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
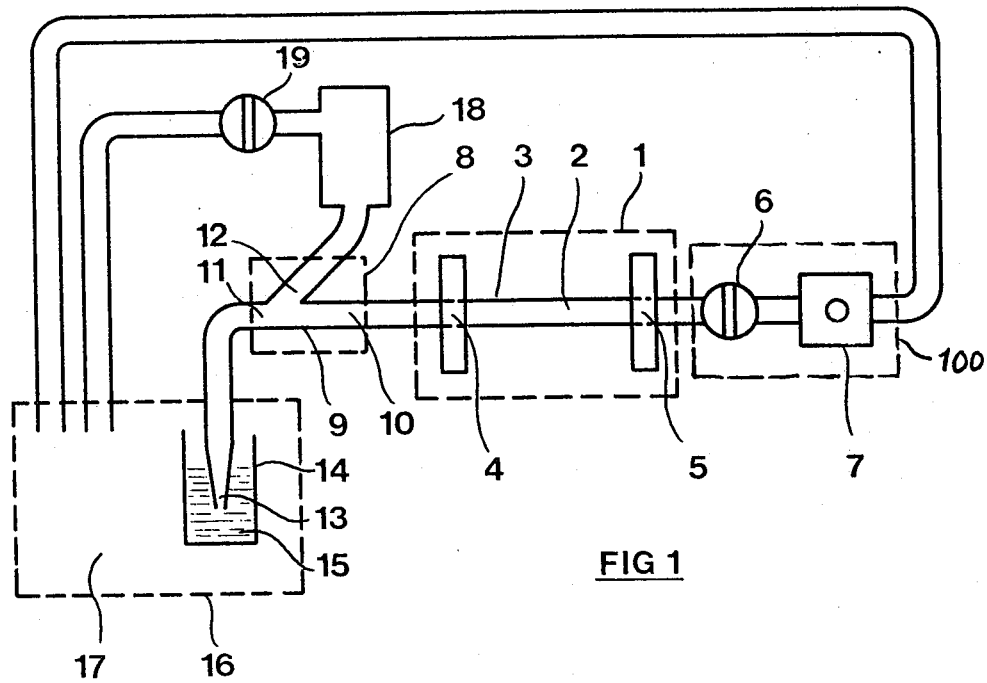
FIG. 1 is a schematic view of a first exemplary embodiment of the apparatus of this development.

In the apparatus construction illustrated by way of example in FIG. 1 a conductor or line section or portion 2 shown within the broken-line block 1 contains a measurement path 3 which is located between two measurement points or locations 4 and 5. At one end the conductor section 2 is connected via a valve 6 with the inlet of a pump device or pump 7. At the other end this conductor section or portion 2 is connected with a connection element or member 9 likewise shown schematically within the broken-line block 8, and specifically with its outlet line or conduit 10. By means of the connection element or member 9 there are flow communicated or interconnected the inlet lines or conduits 11 and 12 with the outlet line or conduit 10. The inlet conduit 11 is connected with a capillary or capillary member 13 which immerses into a liquid 15 contained in a liquid container or receptacle 14. The liquid container 14 is located in a compartment or space 17 which is bounded by the block or frame 16 and is open towards such compartment 17. The inlet conduit 12 is connected with a fluid container 18 which itself is connected via a valve 19 with the compartment or space 17. Also the outlet of the pump device or pump 7 opens into the compartment 17.

According to a variant of the invention the pump device 7 is constructed as a pump having a check valve or as a so-called valve pump, wherein the valve 6 and the pump device 7 are grouped or assembled together into a single unit or apparatus and combined in such a manner that either the pump is in operation and the valve is open or the pump is shut-off and the valve is closed. Upon actuation of the valve there occurs the corresponding actuation of the pump. The pump thus can itself serve as valve if it is sealed in the shut-off condition. Such type pump-valve unit or valve pump has been schematically portrayed in FIG. 1 by reference character 100.

In the described construction of apparatus air is contained in the compartment or space 17, so that the block or frame 16 symbolizes the boundaries of the ambient or recirculated air. There however can be also contained in the compartment 17 a gas which is incapable of reacting with the liquid 15, for instance, nitrogen in the case of a predominantly aqueous liquid 15: then the block 16 schematically surrounds the compartment 17 filled in its entirety with this gas, which is thus separated from the surrounding air. What is important for the proper functioning of the apparatus is that the valve 19 and the liquid container 13 both open into the same gas-filled compartment.

With a preferred application of the described apparatus in combination with a blood cell-counter device which may be of conventional construction and therefore not further described herein, the liquid 15 consists of physiological saline solution i.e. blood which has been predominantly diluted with water. In the space or compartment 17 and also for the fluid there is used, among other things, air in the fluid container 18. The measuring points or locations 4 and 5 are constituted by photoelectric sensing elements or detectors which in conventional manner react to the difference in the refractive index, and respond when there passes thereby a transition from a high refractive index to a low refractive index (forward front of an air bubble) or from a low refractive index to a high refractive index (rear front of an air bubble). The presence of such an air bubble will be explained hereinafter with regard to FIGS. 2, 3 and 4.

Figure 2:
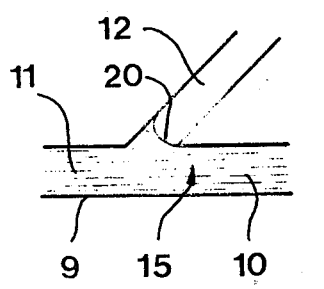
FIG. 2 is a schematic view illustrating the starting condition or state prevailing in the connection element.

In FIG. 2 there is illustrated the starting condition for the operation of the apparatus with respect to the connection element or member 9. In both inlet conduits 11 and 12 and in the outlet conduit 10 there prevails the same pressure. The inlet conduit 11 and the outlet conduit 10 are filled with a stationary liquid 15. In the inlet conduit 12 there is contained air which is separated from the liquid by a meniscus 20. As best seen by referring to FIG. 2 of the drawing the surface tension of the liquid brings about that the liquid slightly penetrates into the inlet conduit 12.

In this starting condition the valves 6 and 19 are closed, the pump device 7 is in operation but its suction action is rendered ineffectual by the valve 6. The entire conduit leading from the valve 6 to the capillary 13 is filled with stationary liquid, especially the connection element 9, as previously described.

Figure 3:
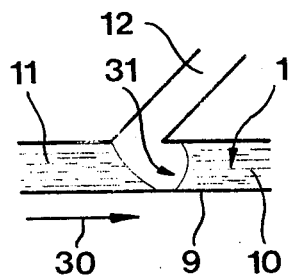
FIG. 3 is a schematic view illustrating the formation of a fluid segment or portion in the connection element.
Figure 4:
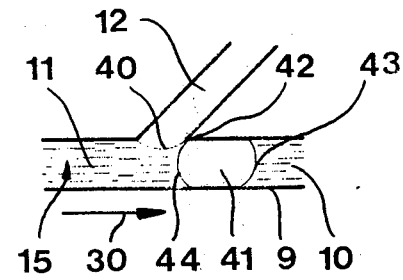
FIG. 4 is a schematic view illustrating the separation or detachment of a fluid segment in the connection element.

Upon opening the valve 6 the liquid is subjected to the suction action of the pump or pump device 7, there prevails a flow from the capillary 13 to the pump device 7 as indicated by the arrow 30 in FIG. 3. In the capillary 13 there now prevails a dynamic pressure drop or decrease which brings about that at the connection element 9 the outlet conduit 10 is at negative pressure with respect to the inlet conduit 12. The air located in the fluid container 18 experiences an expansion corresponding to such negative pressure, a part of this air moving out of the inlet conduit 12 into the outlet conduit 10, as apparent by referring to FIG. 3 of the drawing. There is thus formed an air bubble 31 in the outlet conduit 10, and the air is removed from the fluid container 18. Consequently, the pressure in the fluid container 18 and in the inlet conduit 12 drops until there occurs a pressure equalization between the inlet conduit 11 and the outlet conduit 10. Since the suction action of the pump device 7 further draws the air bubble 31 together with the liquid 15 in the direction of the arrow 30 and the pressure in the inlet conduit 12 consequently would drop or fall below the pressure in the inlet conduit 11, the air bubble breaks away into the connection element 9, as best seen by referring to FIG. 4 of the drawing. The surface tension acts in such a manner that an air bubble 41 is separated or broken away at the acute-angle mouth or opening 42 of the inlet conduit 12 into he outlet conduit 10 and a meniscus 40 closes the inlet conduit 12. This meniscus 40 only temporarily possesses the position and shape, as indicated by reference character 40 and shown in FIG. 4, and very rapidly, i.e. within tenths or fractions of a second, assumes the position and form 20 shown in FIG. 2. The shape of the opening or mouth 42 having an angle of about 135° between the inlet conduit 12 and the outlet conduit 10 insures for a clean tearing-away of the air bubble without forming a rat tail or trail of small bubbles. The preferred angle of 135° is related to the use of the apparatus with aqueous liquid and air; in the case of other liquids, for instance petroleum derivatives different angular values can be desirable from case to case.

The separated air bubble 41 is drawn by the suction action of the pump device 7 together with the liquid 15 through the conduit and thus reaches the conduit section or portion 2 in which there is located the measurement path 3 containing the measuring or measurement locations or points 4 and 5. At the measurement points 4 and 5 there may be advantageously arranged photoelectric sensing or scanning elements which react to the difference between the refractive index of air and the refractive index of the liquid and are connected to a not particularly further described electronic control device. Since the details of the sensors and the control device are not important for the understanding of the invention of this development and inasmuch as such components are conventional, for instance as exemplified by U.S. Pat. Nos. 3,577,162 and 3,614,607 and 3,665,295, the disclosures of which are incorporated herein by reference, no further discussion thereof is thought to be necessary. With the previously mentioned use of the apparatus in a blood cell-counter the counting of the blood cells or particles begins when the rear front 44 of the air bubble 41 travels past the measuring point 4 and the counting operation is stopped when the same rear front 44 of the air bubble 41 travels past the measuring or measurement location 5. The volume of the conduit section or portion 2 in the measuring or measurement path 3, i.e. between the measuring or measurement points 4 and 5 is known with extreme accuracy. Hence, the blood particles or cells located in this known volume are correspondingly accurately determined per unit of volume. After completion of the measurement operation, preferably however after the entire air bubble has passed through the measurement path, which for instance can be determined by scanning the rear front 44 of the air bubble 41 at the measurement point 5, the valve 6 is again closed, whereupon the air bubble and the liquid come to standstill. Thereafter the valve 19 is opened, so that air flows into the fluid container 18 and the negative pressure prevailing therein is diminished. When the liquid comes to standstill there is also diminished the dynamic negative pressure in the parts of the conduit filled by the liquid, so that a pressure equalization occurs with the compartment 17, whereupon the starting condition is again essentially re-established by closing the valve 19.

Figure 5:
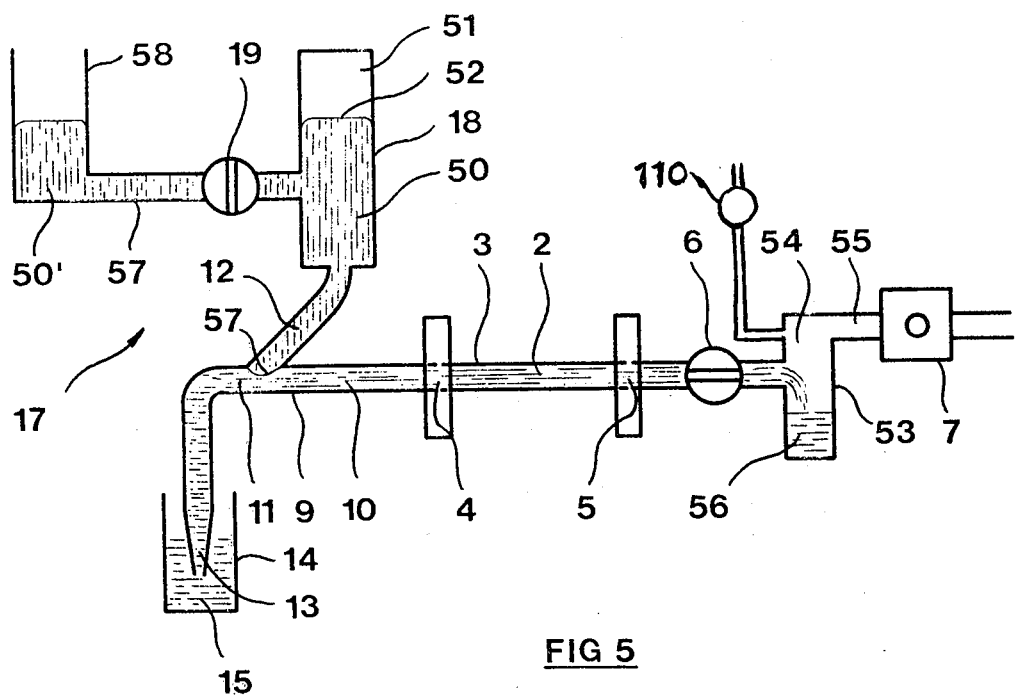
FIG. 5 is a schematic view of another embodiment of the apparatus of this development.

If the apparatus is used for measuring a volume of a relatively volatile liquid, such as for instance benzine or chloroform, then air or gas as the fluid is not suitable because the high vapor pressure of the liquid can cause difficulties. In this case it is recommended to use as the fluid a different liquid which is not miscible with the liquid to be measured, such as for instance water, which is propelled by air contained in the fluid container, as illustrated in FIG. 5 of the drawing. In FIG. 5 the components which are equally shown in FIGS. 1 to 4 and described heretofore have been generally designated with the same reference characters as in the aforementioned FIGS. 1 to 4. In the example under discussion the liquid 15 is assumed to be chloroform, the fluid 50 water, and both are separated from one another by the meniscus 57. The space or compartment 17 of FIG. 1 in the present example leads to the surrounding air, which here thus is equatable to the circulated or recirculated air of the arrangement of FIGS. 1 to 4, so that its enclosure is no longer necessary and has not been shown; the outlet of the pump device 7 as well as the opening of the fluid container 14 lead to the surrounding or ambient air as indicated in FIG. 5. In the fluid container 18 the fluid i.e., the water 50 is separated from the air 51 by a meniscus 52. The inlet of the valve 19 could lead to the surrounding or ambient air, in which case then there would be present, during each measurement, a loss of a small quantity of fluid out of the fluid container 18. As best seen by referring to FIG. 5 it is advantageous if the inlet of the valve 19 leads to a pipe or conduit 57 which immerses into a supply of fluid or water 50' contained in a receptacle or container 58. In this way during each pressure equalization a quantity of fluid is sucked-up in the fluid container via the conduit or pipe 57 and there is replenished the loss of fluid. Between the valve 6 and the pump device 7 there is provided a separator 53 in which there is present an upper gas-filled portion 54 which is connected with the inlet 55 of the pump device 7. The outflow of liquid and fluid collects in the lower portion 56 of the separator 53, at that location separates into its immiscible constituents and does not arrive at the pump device 7, so that such can be optimumly designed as a valve-pump for air. The air volume 54 is considerably greater than the volume of the measurement path 3 in the conduit portion or section 2 between the measurement points 4 and 5. Consequently, the suction action is adequate for carrying out a number of volume-measurements; the valve pump is shut-off during each measurement operation, so that all disturbances caused thereby, especially the vibrations and jarring effects, are eliminated. According to a further schematically illustrated manifestation of this apparatus the negative pressure in the air volume 54 is sensed by a pressure sensor 110 and the pump device 7 which is constructed as a valve pump is only then turned-on when the negative pressure has been reduced i.e. assumes a predetermined value.

The apparatus previously described can for instance be used for the determination of particles suspended in chloroform, as such is useful for certain physical or biological analyses. For this purpose the apparatus is operatively combined with a not particularly here illustrated or further described apparatus for the counting of particles, but which may be of conventional design as for instance discussed above.

Figure 6:
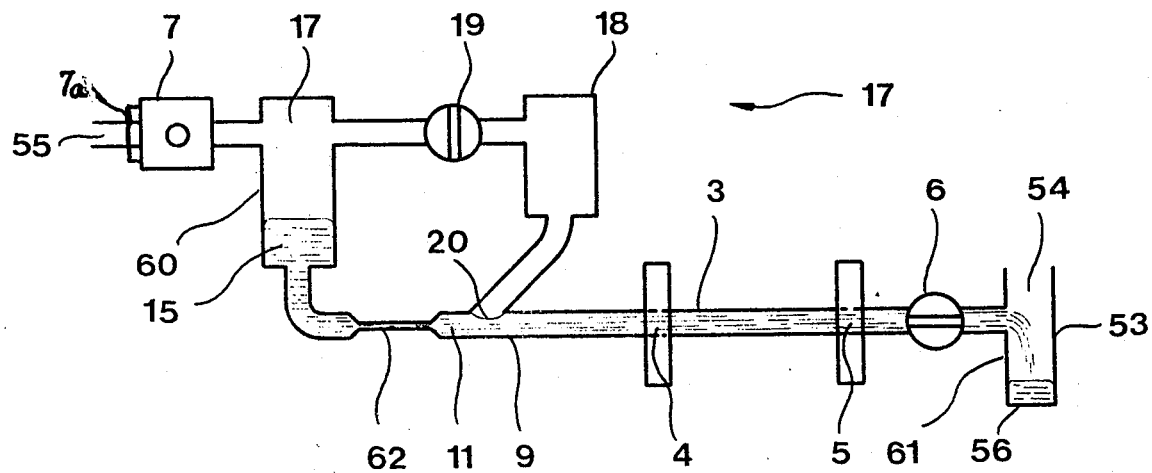
FIG. 6 is a schematic view of a further embodiment of the apparatus of the invention.

In the construction of apparatus according to FIG. 6 the components which have been previously described and shown in FIGS. 1 to 5 are again conveniently designated by the same reference characters. In contrast to the construction illustrated in FIG. 5 in this case the pressure of the surrounding or ambient air is equal to the pressure at the negative pressure side-inlet 55 of the pump device 7. The liquid container 60 is closed with respect to the ambient air, on the other hand the separator 61 is open with respect to the ambient or surrounding air. In the compartment or space 17 there is located air which is at an excess pressure, in this instance however such excess pressure is not limited to an upper boundary or threshold value by the atmospheric pressure. The dynamic pressure drop is achieved by means of a capillary 62 which is appropriately calibrated for the intended purposes. Thus, this construction of the apparatus can be employed for measuring the viscosity of a liquid. There is measured the time during which a volume of the liquid corresponding to the dimensions of the measurement path flows through the capillary. In this regard it can be advantageous to detect the time needed for both the throughpassage of the forward front as well as the rear front of the air bubble in order to eliminate measurement errors. In a manner conventional in the viscometry art, on the basis of the dimensions of the capillary or on the basis of calibrated measurements there is determined the viscosity value.

According to a variant of the invention the pump device 7 is constructed as a valve pump, the schematically indicated valve 7a of which closes when the pump is shut-off. In this regard the pump itself can serve as a valve provided that it is sealed at the time that it is in its turned-off or shut-off state. The compartment 17 in the liquid container 60 is large enough in relation to the volume to be measured that the expansion of the air contained therein is sufficient to propel the liquid and the fluid during a number of volume-measuring operations. Thus, the pump device 7 can be shut-off during each measurement, thereby eliminating the disturbances associated therewith.

With all of the described constructions of apparatus there can be automatically controlled electronic operations such as, for instance, particle counting operations and time-measurement operations by the sensing elements at the measurement points 4 and 5. To this end there are employed automatically controlled valves 6 and 19, for instance electromagnetic valves, but also pneumatic valves. There can be carried out volume- or flow rate-measurements within 1% accuracy, and with digitalization of the particle- or time-measurements there can be obtained extremely large measurement ranges, i.e. very large system dynamics.

With repetitive or series performance of the measurement operations it is advantageous if the conduits in the apparatus are continually wetted or imbued and cleaned by a suitable flushing liquid, so that there are not formed any undesired deposits and crystals. Also it is advantageous that there be used detectors or sensor elements of the type which work in a contactless manner, so that the liquid is not influenced by the apparatus, for instance electrolytically. Finally, the employed measurement principle permits the use of such type valves which do not possess any great dynamic requirements. Also there are not placed any particular demands upon the dimensions of the different conduit sections or upon the flow velocity of the liquid, as long as such values allow for the formation of a fluid segment or slug in the liquid. When using the equipment for the counting of blood particles or cells, there are employed tubes or conduits in the connection element and in the measurement path with, for instance, an inside or internal diameter of 2 millimeters and the flow rate amounts to, for example, 25 $\mu$l/sec. However, depending upon the use and the properties of the liquid and the fluid there can be selected other values of the diameters- and flow rate.

While there is shown and described present preferred embodiments of the invention, it is to be distinctly understood that the invention is not limited thereto, but may be otherwise variously embodied and practiced within the scope of the following claims. ACCORDINGLY,

What is claimed is:

1. An apparatus for measuring a predetermined volume of a liquid, comprising conduit means through which the liquid flows, said conduit means having a first conduit section containing a measurement path, a connection element having an outlet conduit means, said first conduit section having opposed ends, one end of said first conduit section being in flow communication with the outlet conduit means of said connection element, a first inlet conduit and a second inlet conduit, said connection element interconnecting said first inlet conduit and said second inlet conduit with one another, a first valve, a pump device having a low pressure side and a high pressure side, said first conduit section being connected at its other end by means of said first valve with the low pressure side of said pump device, a liquid container for the liquid flowing through the conduit means, a second conduit section including means providing a dynamic pressure drop at the flowing liquid, said first inlet conduit being continuously connected with said liquid container via said second conduit section, a fluid container, said second inlet conduit being continuously in flow communication with said fluid container, a second valve for flow communicating said fluid container with a space, said liquid container being continuously in flow communication with said space, the high pressure side of said pump device opening into said space.

2. The apparatus as defined in claim 1, wherein said space is constituted by the surroundings.

3. The apparatus as defined in claim 1, wherein the space is constituted by the surrounding air.

4. The apparatus as defined in claim 1, wherein the space is defined by means providing a compartment.

5. The apparatus as defined in claim 1, wherein at the region of the connection element the first inlet conduit merges with essentially the same cross-section and direction of extent as the outlet conduit means with said outlet conduit means, and the second inlet conduit extends at a predetermined angle of inclination into the outlet conduit means and in a direction extending away from the flow direction of the liquid through said outlet conduit means.

6. The apparatus as defined in claim 1, wherein the first valve and the pump device are structured to provide a valve pump means such that during operation of the pump device the valve thereof is open and when the pump device is shut-off the valve thereof is closed.

7. The apparatus as defined in claim 6, wherein the pump device when shut-off is sealed and serves as a valve structure.

8. The apparatus as defined in claim 1, wherein the space and at least part of the fluid container are filled with a gas which is insoluble in the liquid.

9. The apparatus as defined in claim 1, further including separator means operatively connected between the first valve and the low pressure side of the pump device, said separator means having an upper gas-filled portion which is connected with the low pressure side of the pump device.

10. The apparatus as defined in claim 1, wherein the second inlet conduit and part of the fluid container are filled with a further liquid which is immiscible with the flowing liquid to be measured, the further liquid serving as said fluid and in which the gas is insoluble.

11. The apparatus as defined in claim 9, wherein the fluid container is connected via the second valve with a container means which opens into the space, said container means containing a supply of fluid.

12. A method of operating an apparatus for measuring a predetermined volume of a flowing liquid which apparatus comprises conduit means through which the liquid flows, said conduit means having means defining a measurement path, a connection element, said conduit means being in flow communication with said connection element, a first inlet conduit and a second inlet conduit, said connection element interconnecting said first inlet conduit and said second inlet conduit with one another, a first valve, a pump device having a negative pressure side and a positive pressure side, said first conduit section being connected by means of said first valve with the negative pressure side of said pump device, a liquid container for the liquid flowing through the conduit means, a second conduit section including means providing a dynamic pressure drop at the flowing liquid, said first inlet conduit being continuously connected with said liquid container via said second conduit section, a fluid container, said second inlet conduit being in flow communication with said fluid container, a second valve for flow communicating said flow container with a space, said liquid container being in flow communication with said space, the positive pressure side of said pump device opening into said space; said method comprising the steps of: during the start of the measuring operation at least partially filling the conduit means with the liquid while maintaining the valves in their closed position, opening the first valve in order to expose the conduit means to the negative pressure of the pump device, propelling the liquid under the action of the negative pressure through the conduit means, introducing a segment of the fluid into the liquid at the region of the connection element, detecting the passage of the fluid segment through the measurement path, thereafter again closing the first valve and for a given period of time opening the second valve in order to equalize the pressure between the fluid container and the space so that there is again established the starting condition of the apparatus.

13. A method of measuring a predetermined volume of a flowing liquid, comprising the steps of:
 a. providing a conduit through which flows the liquid whose volume is to be determined;
 b. at least partially filling the conduit with such liquid;
 c. applying a negative pressure to the conduit in order to convey the liquid contained therein through the conduit;
 d. introducing a fluid slug from a fluid supply into the liquid in the conduit;
 e. detecting the passage of the fluid slug along a predetermined path of travel through the conduit in order to thereby measure a predetermined volume of the flowing liquid; and
 f. substantially equalizing the pressure between the fluid supply and a space with which communicates the liquid in order to re-establish a starting condition of the apparatus.

* * * * *